US006564130B2

(12) United States Patent
Shimazaki et al.

(10) Patent No.: US 6,564,130 B2
(45) Date of Patent: May 13, 2003

(54) STEERING ASSIST APPARATUS

(75) Inventors: Kazunori Shimazaki; Hisashi Kuriya, both of Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 190 days.

(21) Appl. No.: 09/740,271

(22) Filed: Dec. 19, 2000

(65) Prior Publication Data
US 2001/0027363 A1 Oct. 4, 2001

(30) Foreign Application Priority Data
Dec. 24, 1999 (JP) ............................. 11-367459

(51) Int. Cl.[7] ..................... G06F 17/00; G05D 1/00
(52) U.S. Cl. ..................... 701/41; 180/443; 180/446
(58) Field of Search ................... 701/41, 36, 42, 701/43; 180/443, 446, 444, 422, 415, 412

(56) References Cited

U.S. PATENT DOCUMENTS

| 4,866,617 A | * | 9/1989 | Matsuda et al. ............ 701/25 |
| 5,390,118 A | * | 2/1995 | Margolis et al. ........... 701/23 |
| 5,517,412 A | * | 5/1996 | Unoura ...................... 701/23 |
| 6,092,619 A | * | 7/2000 | Nishikawa et al. ......... 180/446 |
| 6,275,754 B1 | * | 8/2001 | Shimizu et al. ............ 701/41 |
| 6,285,930 B1 | * | 9/2001 | Dickson et al. ............ 701/28 |
| 6,292,111 B1 | * | 9/2001 | Ishikawa et al. .......... 340/937 |

FOREIGN PATENT DOCUMENTS

| EP | 1 022 903 A2 | 7/2000 | ........... H04N/7/18 |
| EP | 1043191 | * 11/2000 | ........... B60R/1/00 |
| JP | 2-36417 | 8/1990 | |
| JP | 2000-78566 | 3/2000 | |

* cited by examiner

Primary Examiner—William A. Cuchlinski, Jr.
Assistant Examiner—Olga Hernandez
(74) Attorney, Agent, or Firm—Morgan & Finnegan, LLP

(57) ABSTRACT

Steering assist apparatus displays vehicle locus guide lines used to assist the steering wheel handling during parking on a monitor screen in which the rear side of a vehicle is image-picked up. The vehicle locus guide lines include a basic length part which links points B1, B4, B8 and B5, and an extension length part which links the points B4, E10, E17 and B8 and a middle point EM, and the curved amount and the extension amount of extension length part are determined in accordance with a steering angle. In addition, the extension length part is divided into stages in order to be recognized, and the extension length part is shortened one stage by one stage as a vehicle comes nearer a target parking space.

8 Claims, 6 Drawing Sheets

STEERING ANGLE OF 90 DEGREES

STEERING ANGLE OF 315 DEGREES

STEERING ANGLE OF 450 DEGREES

STEERING ASSIST APPARATUS

BACKGROUND OF THE INVENTION

1. Field of the Invention

The present invention relates in general to a steering assist apparatus which operates when a vehicle moves back for parking, and more particularly to an apparatus for superimposing to display the display information used to assist the steering wheel handling during parking on a monitor screen in which the rear side of a vehicle is image-picked up.

2. Description of the Related Art

Heretofore, there has been proposed an apparatus in which in the case where a vehicle is moving back and a driver can not see the target place since this place is in a blind spot, the rear field of view of the vehicle is displayed on a monitor. For example, in Japanese Patent Examined Publication No. 2-36417, there is disclosed a monitoring apparatus for displaying thereon the rear side of a vehicle including: a television camera for photographing the rear side of a vehicle; a monitoring television for displaying thereon an image which has been photographed by the television camera; a sensor for outputting an information signal relating to a tire steering angle; and a circuit for generating a marker signal in accordance with the information signal outputted from the sensor to superimpose a marker on a picture of a television for display. In this apparatus, the steering angle data of the tires and the marker position data along the backing direction of a vehicle corresponding to the steering angle are both stored in a ROM, and the expected backing locus of the vehicle corresponding to the steering angle at this time is displayed as a line of a marker on the television screen with the expected backing locus superimposed on the image which has been photographed by the television camera.

In accordance with such an apparatus, when the vehicle moves back, the rear field of view such as of the road situation and the expected backing locus of the vehicle corresponding to the steering angle are both displayed on the screen of the monitoring television. Therefore, a driver can move the vehicle back by manipulating the steering while looking at the television screen without turning back.

However, if such a conventional apparatus is intended to be applied to the parking operation, then the following problems arise. That is, for the conventional expected backing locus, the information relating to the length corresponding to the distance determined between the rear part of a vehicle and the rear of the vehicle, e.g., the length corresponding to the distance of about 2.5 m from the rear part of the vehicle is always displayed on the monitoring television. Therefore, there arises a problem that when the position of the vehicle turns largely from the target parking space, the length of the expected backing locus becomes insufficient since the expected backing locus is also largely curved on the monitor screen, and hence the head part of the expected backing locus is terminated before the target parking space on the monitor screen so that it is difficult to finally judge whether or not, the vehicle can move to the target parking space. On the other hand, if the length of the expected backing locus is made too long in order to solve such a problem, when the amount of turning the vehicle to the target parking space is small, since the expected backing locus is also not curved so much on the monitor screen, the length of the expected backing locus is more than enough. Therefore, there arises a problem that the vicinity of the head part of the expected backing locus goes beyond the target parking space to be projected therefrom, and hence this situation leads to a display which is difficult for a driver to percept.

SUMMARY OF THE INVENTION

In the light of the foregoing, the present invention has been made in order to solve the above-mentioned problems associated with the prior art, and it is therefore an object of the present invention to provide a steering assist apparatus in which the expected backing locus has a suitable length corresponding to the position of a vehicle to a target space.

In order to attain the above-mentioned object, according to the present invention, there is provided a steering assist apparatus including: a camera for photographing the rear of a vehicle; a monitor for displaying thereon the image of the rear of the vehicle which has been photographed by the camera; a steering angle sensor for detecting a steering angle of a steering wheel; locus deriving means for deriving a vehicle locus guide line having a fixed basic length and an extension length corresponding to the steering angle; and display control means for superimposing and displaying the vehicle locus guide line and the image on the rear of the vehicle on the monitor.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiment in the case where a steering assist apparatus according to the present invention is implemented during parallel parking will hereinafter be described in detail with reference to the accompanying drawings.

Figure 1:
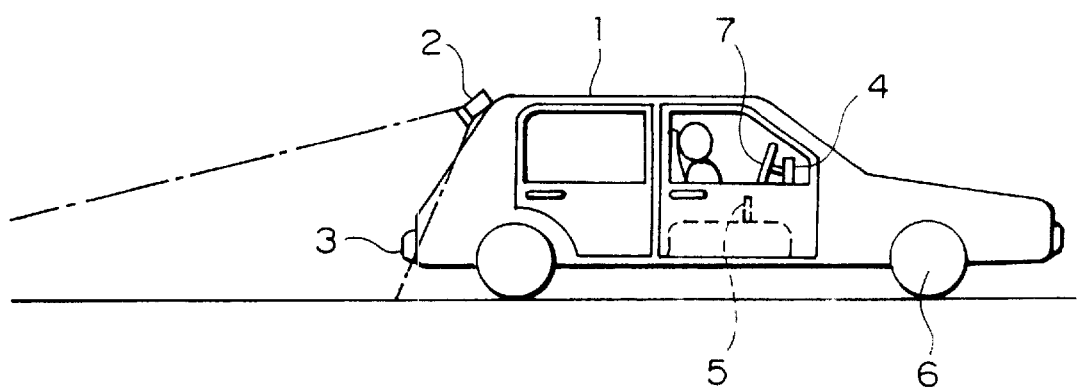
FIG. 1 is a side elevational view showing a vehicle on which a steering assist apparatus according to an embodiment of the present invention is mounted.

As shown in FIG. 1, a camera 2 for photographing the rear field of view of a vehicle 1 is mounted on the rear part of the vehicle 1. A rear bumper 3 of the vehicle 1 is provided in field of view of the camera 2 at portion near the vehicle 1. A monitor 4 which is a liquid crystal display of a color type is arranged in a driver's seat of the vehicle 1. The monitor 4 is normally used as the display device of the navigation device. Then, when a shift lever 5 provided in the driver's seat is operated to the backing position, the image provided by the camera 2 is displayed on the monitor 4.

Front wheels 6 as the steering wheels are steered by the operation of a steering wheel 7. The steering angle of the front wheels 6 is expressed in the form of the value which is obtained by multiplying the steering angle of the steering wheel 7 by a predetermined coefficient.

Figure 2:
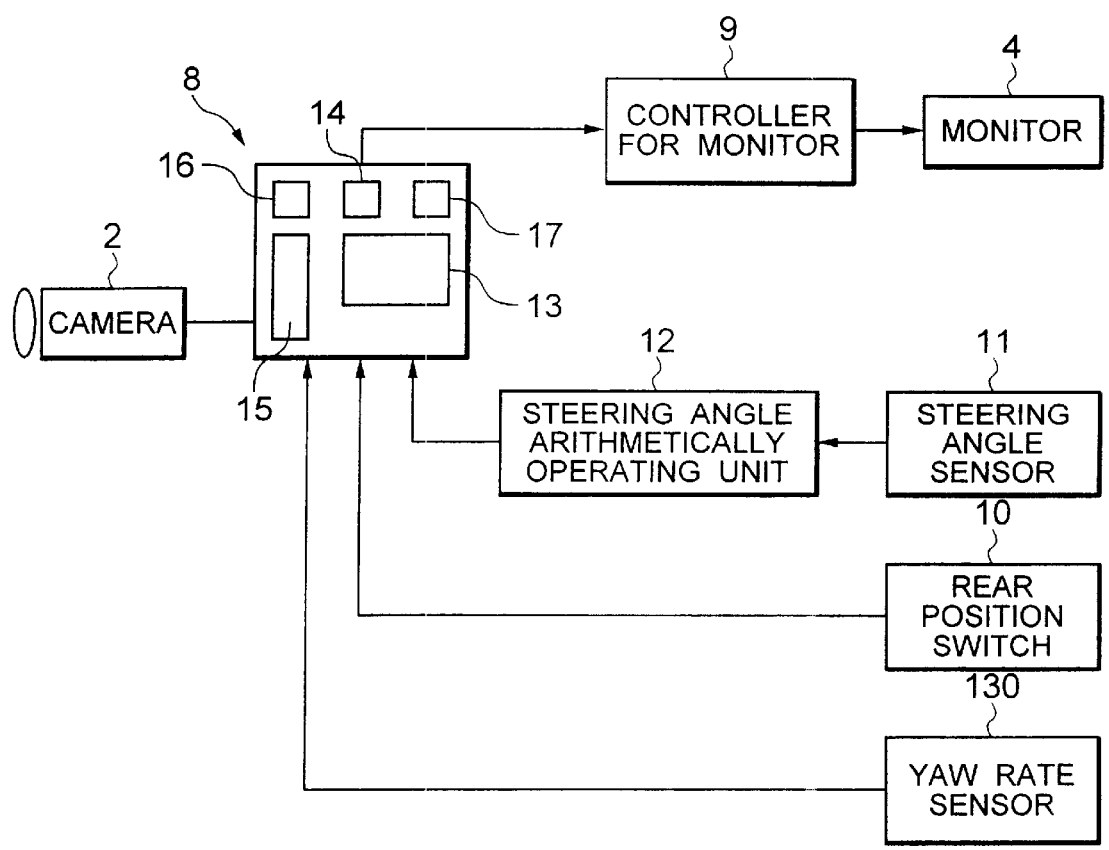
FIG. 2 is a block diagram showing a configuration of the steering assist apparatus according to the embodiment of the present invention.

FIG. 2 is a block diagram showing a configuration of the steering assist apparatus according to the embodiment of the present invention. An image processing apparatus 8 as display control means is electrically connected to the camera 2, and the monitor 4 is electrically connected to the image processing apparatus 8 through a controller 9 for a monitor. In addition, the vehicle 1 is provided with a rear position switch 10 for detecting whether or not the shift lever 5 has been switched over to the backing position, and the rear position switch 10 is electrically connected to the image processing apparatus 8. In addition, a steering angle sensor 11 for detecting the steering angle of the steering wheel 7 is mounted to the steering axis of the steering wheel 7, and this steering angle sensor 11 is electrically connected to the image processing apparatus 8 through a steering angle arithmetically operating unit 12. Furthermore, a yaw rate sensor 130 as vehicle position detecting means for detecting the position of the vehicle 1 is electrically connected to the image processing apparatus 8.

While the monitoring controller 9 normally displayed on the monitor 4 the image based on a display signal which has been inputted from the navigation device (not shown), when the display signal has been inputted from the image processing apparatus 8, the monitoring controller 9 displays the image based on the display signal on the monitor 4. In addition, the steering angle arithmetically operating unit 12 arithmetically operates the steering angle of the front wheels 6 on the basis of the steering angle of the steering wheel 7 detected by the steering angle sensor 11 to output the steering angle to the image processing apparatus 8.

The image processing apparatus 8 includes: a CPU 13; a ROM 14 for storing therein the control program; an image processing processor 15 for processing the image data from the camera 2; an image memory 16 for storing therein the image data which has been processed in the image processing processor 15; and a RAM 17 for the work.

The display control means is constituted by the image processing apparatus 8 and the monitoring controller 9 as described above.

Figure 3:
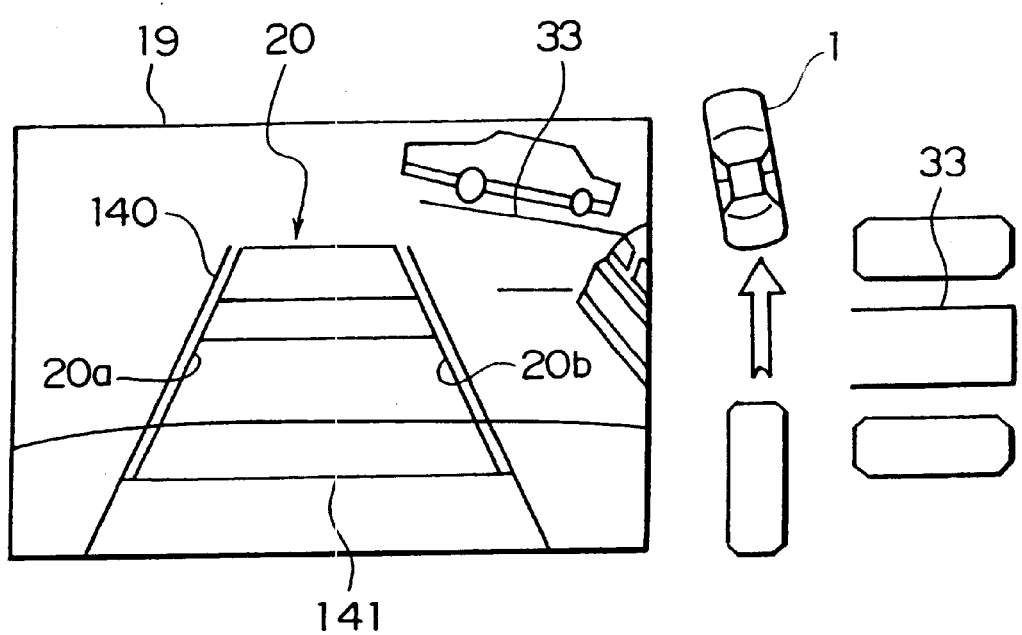
FIG. 3 is a view showing schematically the position of a vehicle and a monitor screen during parallel parking in the embodiment of the present invention.

In addition, the CPU 13 also functions as the locus deriving means, and operates on the basis of the control program stored in the ROM 14, and when detecting that the shift lever 5 has been switched over to the backing position by the rear position switch 10, parallel parking is to be started, thereby deriving the vehicle locus guide 20 and a vehicle guide line 140 as the expected backing locus which are displayed on the screen 19 of the monitor 4 as shown in FIG. 3.

Figure 4:
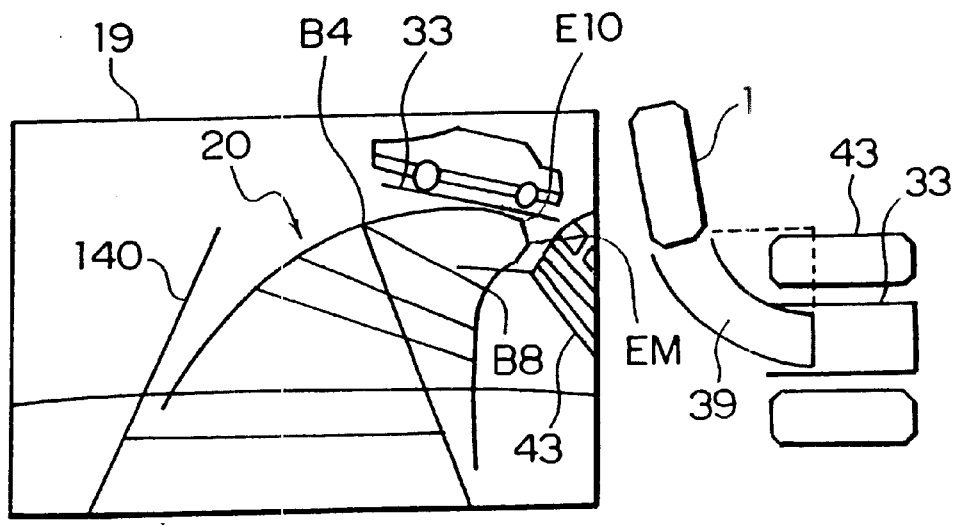
FIG. 4 is a view showing schematically the position of a vehicle and a monitor screen during parallel parking in the present embodiment, and also showing a next stage of FIG. 3.

The vehicle locus guide line 20 corresponds to the expected locus of the vehicle 1 when the vehicle 1 moves back while holding the steering angle of the front wheels at that time, and is obtained in such a way that the CPU 13 arithmetically operates the expected locus of the vehicle 1 when the vehicle 1 moves back with the steering angle of the steering wheel 7 at that time on the basis of the output signal of the steering angle arithmetic operation unit 12. For this reason, if the steering wheel 7, for example, is swung to the right, the vehicle locus guide line 20 is correspondingly curved as shown in FIGS. 4 and 5.

Figure 5:
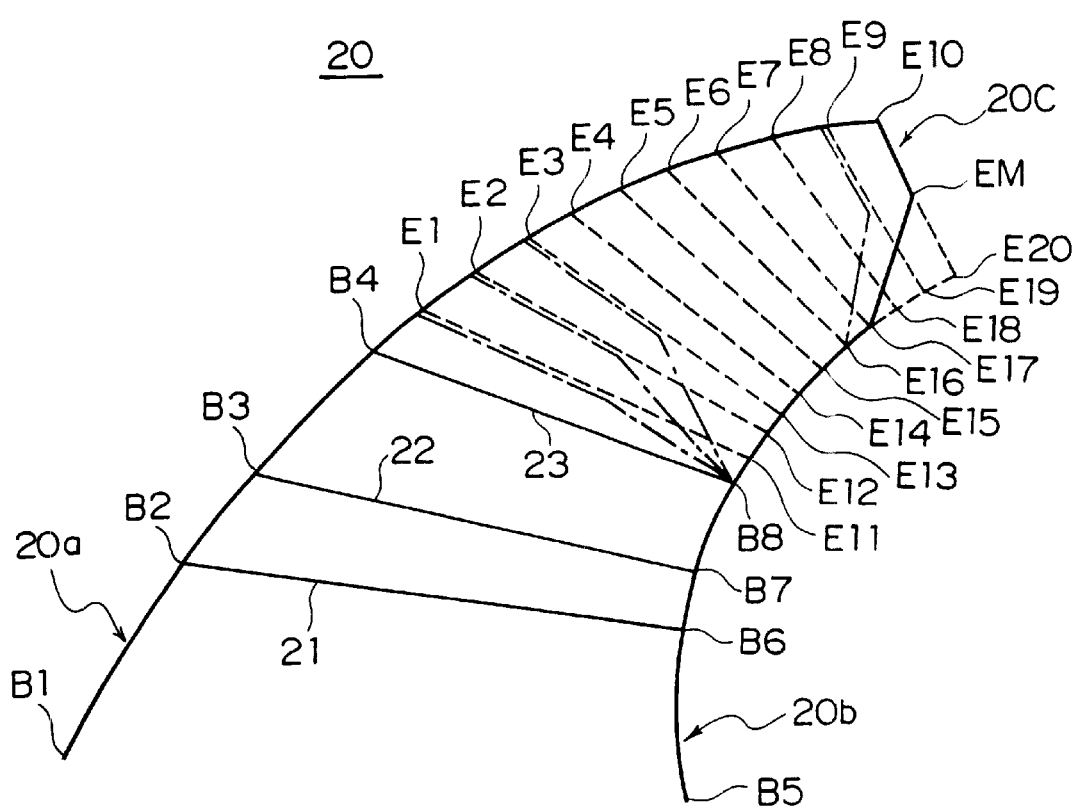
FIG. 5 is a view showing the structure of a vehicle locus guide line in the present embodiment.

As shown in FIG. 5, the vehicle locus guide line 20 includes: a one pair of left and right side lines 20a and 20b expressing roughly the locus of both side parts of the vehicle; and a head line 20c through which the end parts of the side lines 20a and 20b are coupled to each other. The side line 20a, under the condition of having the maximum length, consists of the basic length part of the line segment extending from a point B1 up to a point B4 and the extension length part of the line segment extending from the point B4 up to a point E10. In addition, the side line 20b, under the condition of having the maximum length, consists of the basic length part of the line segment extending from a point B5 up to a point B8 and the extension length part of the line segment extending from the point B8 up to a point E20.

The vehicle locus guide line 20 includes: a line segment 21 which links a point B2 and a point B6, a line segment 22 which links a point B3 with a point B7, and a line segment 23 which links a point B4 with a point B8. The line segments 21, 22 and 23 represent respectively the positions of the rear bumper when the vehicle 1 moves back, on the road surface, from the position of the rear bumper at that time by 1 m, 1.5 m and 2.5 m, respectively.

A vehicle width guide line 140 indicates the expected position of both side parts of the vehicle 1 when the vehicle 1 moves straightly back, is shown by the CPU 13 on the basis of the width data of the vehicle 1 previously stored in the ROM 14. A vehicle width guide line 140 is drawn as the visible out line of the plane projected pattern of the virtual vehicle when the vehicle is virtually arranged in such a way as to come into contact with the rear bumper in the current vehicle position. A line segment 141 at a lower part of the vehicle width guide line 140 is the bumper line indicating the position of the rear bumper of the current vehicle.

Next, the operation of the steering assist apparatus according to the present embodiment will hereinbelow be described by taking as an example the case where the vehicle 1 is parked in a target parking space 33 located in the rear-right of the vehicle 1. First of all, a driver drives the vehicle to pass forwardly through the side part of a parking space 33 which is located in the rear of the vehicle, and then stops the vehicle at the angle near a right angle with respect to the parking space 33 and in the position where the rear end of the vehicle goes beyond the parking space 33 by 2 to 3 m. Next, a driver confirms the safety and the positional relationship between the parking space 33 in the rear of the vehicle and his/her vehicle by visual observation and operates the shift lever 5 to the backing position. At this time, the image processing apparatus 8, on the basis of a detection signal from a rear position switch 10 obtained by switching the shift lever 5, superimposes the vehicle width guide line 140 and the vehicle locus guide line 20 on the image in the rear of the vehicle obtained from the camera 2 to display thereof as shown in FIG. 3. In this connection, in the state of FIG. 3, the steering wheel 7 is assumed to be located roughly in the neutral position so that the side lines 20a and 20b of the vehicle locus guide line 20 is roughly in parallel with the vehicle width guide line 140 and also only displays the basic length part (the area having as the apexes the points B1, B4, B8 and B5 in FIG. 5) of the vehicle locus guide line 20.

Next, if from this state, a driver turns the steering wheel right, then as shown in FIG. 4, the vehicle locus guide line 20 is curved to the right side on the monitor screen 19 and also the extension length part of the vehicle locus guide line 20 is also displayed. That is, the vehicle locus guide line 20 is seen on the monitor screen 19 as if only the extension length part thereof is extended. Now, the area having as the apexes the points B1, E10, E20 and B5 of the vehicle locus guide line 20 in FIG. 5, expresses the locus 39 on the screen of the monitor 19 of the vehicle 1 when the steering angle is held as shown in FIG. 4, and the vehicle moves back in such a way as to turn only by about 90. That is, in the present embodiment, the vehicle locus guide line 20 shows the locus when even in the state in which the largest extension is provided the vehicle turns only by about 90 degrees. How much extension the vehicle locus guide line 20 will have, in other words, how much extension will be added to the basic length part is determined by the steering angle of the steering wheel 7. Therefore, when a driver operates the steering wheel 7, in response thereto, the curved amount of the vehicle locus guide line 20 and the extension amount thereof are changed together.

Figure 6A:
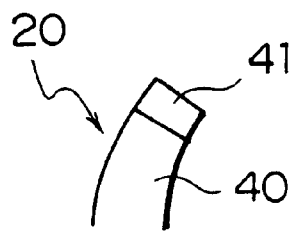
FIGS. 6A, 6B and 6C are respectively views showing schematically the relation between a steering angle of a steering wheel, and the curved amount of the vehicle locus guide line and the extension amount thereof in the present embodiment.
Figure 6B:
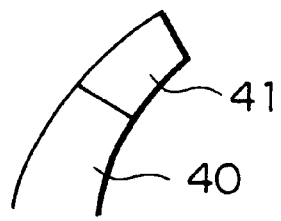
Figure 6C:
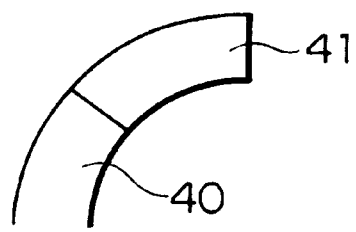

FIGS. 6A, 6B and 6C show schematically the relation between the steering angle of the steering wheel 7, and the curved amount of vehicle locus guide line 20 and the extension amount thereof. The vehicle locus guide line 20 consists of the basic length part 40 and the extension length part 41, and the extension amount of extension length part 41 is increased as the steering angle of the steering wheel 7 is further increased. In the present embodiment, as shown in FIG. 4, in the state in which the vehicle 1 is positioned so it has turned by about 90 degrees with respect to the target parking space 33, it is set so as to show the locus when the vehicle moves back turning by about 90 degrees at the steering angle (450 degrees in the present embodiment) when a driver steers the steering wheel 7 in order to move the vehicle 1 to the target parking space 33. Therefore, even in the state in which since conventionally, the target parking space 33 is displayed in the side part on the monitor screen 19 because the vehicle 1 is located in the position resulting from the vehicle turning by about 90 degrees with respect to the target parking space 33, and the vehicle locus guide line becomes insufficient, in the present embodiment, since for the vehicle locus guide line 20, the locus by turn of 90 degrees of the vehicle is displayed, the state that the head part of the vehicle locus guide line 20 does not reach the target parking space 33 and is terminated at the position before the space 33 is prevented. Therefore, if a driver looks at the vehicle locus guide line 20 when the steering wheel is turned, he/she can readily judge whether or not the vehicle 33 can move to the target parking space 33 with the steering angle at that time.

On the other hand, unlike the state shown in FIG. 4, in the case where the parking starts with the state in which the turning angle of the vehicle 1 with respect to the target parking space 33 is smaller than 90 degrees, the necessary wheel steering angle may also be smaller. Therefore, the vehicle locus guide line 20 extends in the vertical direction of the monitor screen 19 and hence is not curved so much. Therefore, since the length of the vehicle locus guide line 20 which is required for display may be short, in the present embodiment, for the amount the steering angle becomes smaller, the extension length part 41 of the vehicle locus guide line 20 is also displayed short for that amount. Thus, there does not arise the problem that the vehicle locus guide line 20 which is longer necessary is displayed so that the monitor screen 19 is hard to see. In addition, in actual parallel parking, it is hardly conceivable that the vehicle 1 is stopped at the position where the turn angle of the vehicle 1 with respect to the target parking space 33 becomes larger than 90 degrees, and the parking starts at this position. Therefore, the length of the vehicle locus guide line 20 does not extend infinitely in accordance with the steering angle, and is set to become the length of the locus corresponding to the turn angle of the vehicle of 90 degrees at a maximum. That is, when the steering angle of the steering wheel 7 exceeds 450 degrees, even if a driver turns the steering wheel 7 further, the vehicle locus guide 20 does not extend at all.

The extension length part of the vehicle locus guide line 20 having as the apexes the points B4, E10, E20 and B8, in the image processing apparatus 8, as shown by the dotted line in FIG. 5, is recognized with this part divided into 10 stages in the extension direction. A head line 20c of the vehicle locus guide line 20 which is actually displayed on the monitor screen 19 in the state shown in FIG. 4 becomes the bent line segment which links the three points, the point E10, the middle point EM between the points E10 and E20, and the point E17 showing the length of a part of the extension length part which is shorter than the maximum length shown by the point E20 by three stages. That is, a head line 20c includes a part of a line segment which links the points E10 and E20 of one pair of left and right side lines 20a and 20b when the side line 20b located inside the turn is drawn as it is equal to the side line 20a located outside the turn in regard to the distance from the vehicle 1. That is, out of the one pair of left and right side lines 20a and 20b, the distance which is shown by the side line 20b located inside the turn is shorter than that shown by the side line 20a located outside the turn. As a result, if all of the extension length parts having as the apexes the points B4, E10, E20 and B8 is displayed on the monitor screen 19, even when the side line 20b located inside the turn overlaps with a vehicle 43 (refer to FIG. 4) which is being parked adjacent to the target parking space 33, in the present embodiment the side line 20b located inside the turn does not overlap with the vehicle 43, and hence the vehicle locus guide line 20 which is easy to percept by a driver can be displayed.

Figure 7:
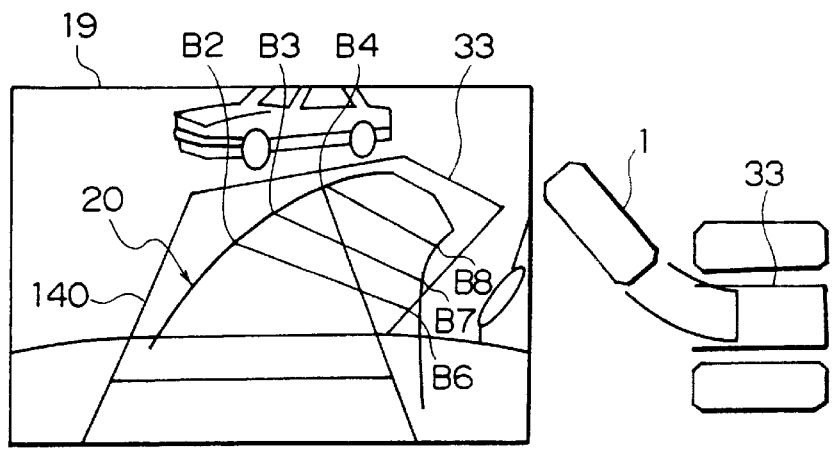
FIG. 7 is a view showing schematically the position of a vehicle and the monitor screen during parallel parking in the present embodiment and also showing a next stage of FIG. 4.

If the vehicle locus guide line 20 including the extension length part as described above is displayed on the monitor screen 19, then a driver steers the steering wheel 7 while looking at the monitor screen 19 so that the vehicle locus guide line 20 reaches properly the target parking space 33 to fit thereinto as shown in FIG. 4. Then, a driver moves back the vehicle 1 while maintaining the steering angle of the steering wheel 7 at that time. In addition, at the same time, the turn angle of the vehicle which has been changed by the retrocession is detected by the yaw rate sensor 130, and in the present embodiment the extension length part is shortened one stage by one stage every time the vehicle turn angle is changed by 4 degrees. That is, when the turn angle of the vehicle is firstly changed by 4 degrees, the head line 20c of the vehicle locus guide line 20 which has linked the point E10, the middle point EM between the points E10 and E20, and the point E17 until now, becomes the line segment which links the point E9, the middle point between the points E9 and E19, and the point E16 as shown by the dotted line in FIG. 5, and hereinbelow, the extension length part is shortened one stage by one stage every time the turn angle of the vehicle is changed by 4 degrees. Then, after the turn angle of the vehicle has been changed by 28 degrees from the first state, the extension length part is shortened by 7 stages in total, and hence the head line of the vehicle locus guide line 20, as shown by the dotted line in FIG. 5, becomes the line segment which links the point E3, the middle point between the points E3 and E13, and the point B8. Therefore, in the case where the vehicle 1 continues to move back to come near the target parking space 33, when the vehicle locus guide line having the same length as that in the first state continues to be displayed, it is conceivable that the vehicle locus guide line projects from the target parking space 33. However, in the present embodiment, as shown in FIG. 7, since the length of the vehicle locus guide line gradually shortens, such a problem does not arise at all.

In addition, if the vehicle continues to move back so that the turn angle is changed by 32 degrees from the first state, then the extension length part of the vehicle locus guide line 20 is shortened by 8 stages in total and hence the head line, as shown by the dotted line in FIG. 5, becomes the line segment which links the point E2, the middle point between the points E2 and E12, and the point B8. That is, the difference between the positions of the both ends of the head line is decreased from by 3 stage to 2 stages, and the bent angle of the head line becomes more gentle. As a result, even if the vehicle locus guide line 20 is short and also the head part thereof is displayed in the more central portion of the monitor screen 19, the state is obtained in which the more natural display can be carried out for the image in the rear of the vehicle, and hence this state is easy to percept by a driver.

In addition, if the vehicle continues to move back so that the turn angle is changed by 36 degrees from the first state, then the extension length part of the vehicle locus guide line 20 is shortened by 9 stages in total and hence the head line, as shown by the dashed line in FIG. 5, becomes the line segment which links the point E1, the middle point between the points E1 and E11, and the point B8. Further, if the turn angle is changed by 40 degrees in total, then all of the extension length part is lost. That is, only the basic length part of the vehicle locus guide line 20 remains, and hence the head line thereof becomes the straight line segment linking the point B4 and the point B8.

Figure 8:
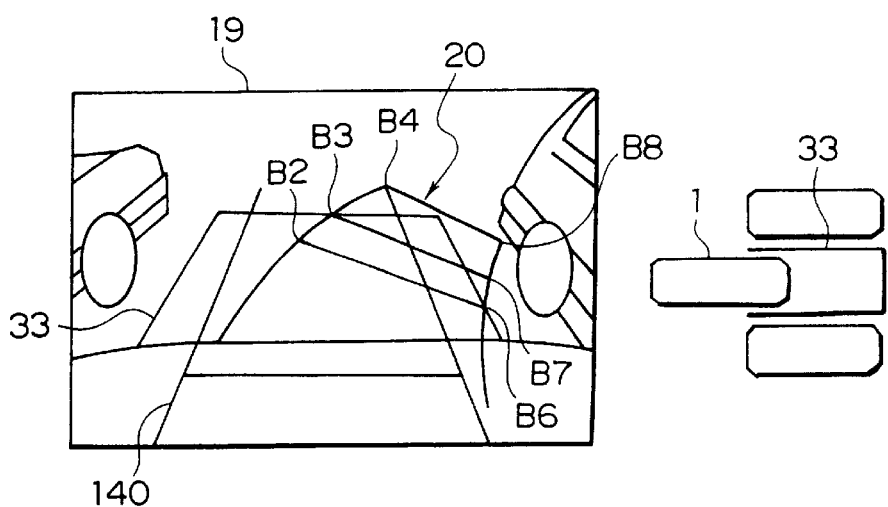
FIG. 8 is a view showing schematically the position of a vehicle and the monitor screen during parallel parking in the present embodiment and also showing a next stage of FIG. 7.
Figure 9:
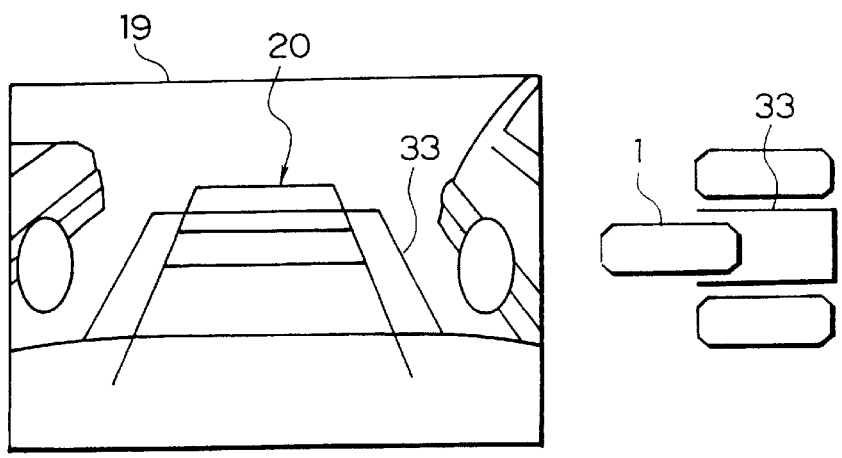
FIG. 9 is a view showing schematically the position of a vehicle and the monitor screen during parallel parking in the present embodiment and also showing a next stage of FIG. 8.

Then, as shown in FIG. 8, if a vehicle guide line 140 and the target parking space 33 become in parallel with each other, then a driver turns the steering wheel 7 back to the neutral position, whereby as shown in FIG. 9, moves the vehicle 1 back in a straight line in the state in which the vehicle locus guide line 20 becomes in parallel with the target parking space 33. In a manner as described above, parallel parking is completed.

In this connection, it should be noted that the steering assist apparatus according to the present invention is not limited to the above-mentioned embodiment and may also be implemented by being changed as follows. That is, while in the above-mentioned embodiment, the extension length part of the vehicle locus guide line 20 is constructed in such a way as to be changed by the turn angle of 45 degrees, but the present invention is not limited thereto. For example, the extension length part may be changed by 3 degrees or 2 degrees for example. Conversely, the extension length part may also be changed by 4 degrees or larger than it. In addition, the division of the extension length part is not limited to the 10 stages, and hence the division thereof may also be equal to or smaller than the 9 stages, or equal to or higher than the 11 stages.

In addition, since the position of the vehicle can be specified by the yaw rate sensor, it is also possible that whenever the vehicle has reached a suitable position, the voice guide may be outputted, or the character guide may be displayed on the monitor screen 19.

Furthermore, the apparatus may also be configured in such a way that instead of the yaw rate sensor, the distance of the back movement of a vehicle is measured and the turn position of the vehicle is specified on the basis of such a distance and the steering angle.

As set forth hereinabove, according to a steering assist apparatus of the present invention, a vehicle locus guide line has an extension length part which is determined on the basis of the steering angle. Therefore, even in the position where the turn amount of vehicle for a parking target space is large, the situation that the length of the vehicle locus guide line is insufficient and hence the guide line is terminated without reaching the parking target space is prevented, and also in the position where the turn amount of vehicle for the parking target space is small, the situation that the length of the vehicle locus guide line is left over so that the guide line projects from the target parking space is prevented.

In addition, in the case where the vehicle locus guide line is the locus length for about 90 degrees of the vehicle turn angle at a maximum, since if necessary the locus for about 90 degrees of the vehicle turn angle is displayed, even in the position where the turn amount of vehicle for the parking target space is large, the length of the vehicle locus guide line is not insufficient at all. In addition, as the practical problem in the parallel parking, since it is conceivable that the needs of the locus of the vehicle turn angle of equal to or larger than 90 degrees is hardly present, even when the vehicle is located in the position where the turn amount of vehicle for the parking target space is remarkably large, the problem can be prevented that the unnecessarily long vehicle locus guide line is displayed on the monitor screen so that the screen is hard to be seen.

In addition, in the case where the extension length of the vehicle locus guide line is shortened as the position of the vehicle comes nearer the target parking space, when the vehicle is far from the target parking space, since the vehicle locus guide line has the sufficient extension length part, it is possible to prevent the problem that the head part of the vehicle locus guide line is terminated at the position before the target parking space and it is difficult to finally judge whether or not the vehicle can move to the target parking space. On the other hand, when the vehicle comes near the target parking space, since the vehicle locus guide line is shortened, it is possible to prevent the problem that the position in the vicinity of the expected back-movement locus goes beyond the target parking space to be projected therefrom.

Also, when the vehicle is located in a predetermined range with respect to the target parking space, if the distance expressed by the side line located inside the turn from the one pair of left and right side lines is made shorter than that expressed by the side line located outside the turn, the head part of the vehicle locus guide line is displayed so as to taper off. Therefore, it is prevented that the side line located inside the turn is observed in such a way as to overlap with the existing parking vehicle, in terms of display, and in addition thereto, it is possible to realize the natural display adapted to perspective, and hence it is possible to carry out the steering assist which is easy to percept by a driver.

What is claimed is:

1. A steering assist apparatus comprising:
   a camera for photographing the rear side of a vehicle;
   a monitor for displaying thereon the image of the rear side of the vehicle which has been photographed by said camera;
   a steering angle sensor for detecting a steering angle of a steering wheel;

locus deriving means for deriving a vehicle locus guide line having a fixed basic length and an extension length, extension amount of the extension length and curved amount of the vehicle locus guide line being changed depending on the steering angle respectively; and display control means for superimposing and displaying the vehicle locus guide line and the image on the rear side of the vehicle on said monitor.

2. A steering assist apparatus according to claim 1, wherein said vehicle locus guide line is for parallel parking; and said vehicle locus guide line has a locus length for about 90 degrees of the vehicle turn angle at a maximum.

3. A steering assist apparatus according to claim 1, further comprising vehicle position detecting means for detecting a position of the vehicle with respect to a target parking space; and wherein said locus deriving means shortens the extension length as the position of the vehicle comes nearer said target parking space.

4. A steering assist apparatus according to claim 3, wherein said vehicle position detecting means is comprised of a yaw rate sensor.

5. A steering assist apparatus according to claim 3, wherein said vehicle guide line includes a pair of left and right lines exhibiting roughly the locus of a left side and a right side of the vehicle and a head part line which links the head parts of said pair of left and right side lines; and when the vehicle is located in a predetermined range with respect to said target parking space, the distance expressed by the side line which is located inside the turn out of said pair of left and right side lines is shorter than that expressed by the side line which is located outside the turn.

6. A steering assist apparatus according to claim 5, wherein the difference between the distance expressed by the side line which is located inside the turn out of said one pair of left and right side lines and the distance expressed by the side line which is located outside the turn becomes small as the vehicle comes nearer said target parking space.

7. A steering assist apparatus according to claim 6, wherein said head part line includes a part of a line segment which links the head parts of said one pair of left and right side lines when said side line located inside the turn is drawn as it is equal to said side line located outside the turn in regard to the distance from the vehicle, is connected to said head part of said side line located outside the turn, and is largely bent as the vehicle is located farther away from said target parking space.

8. A steering assist apparatus according to claim 1, wherein said display control means further displays a vehicle width guide line exhibiting roughly the position of a left side and a right side of the vehicle when the vehicle moves back straightly.

* * * * *